US006995653B2

(12) United States Patent
Takahashi et al.

(10) Patent No.: US 6,995,653 B2
(45) Date of Patent: Feb. 7, 2006

(54) VEHICLE-MOUNTED DEVICE COMMUNICATION CONTROLLER

(75) Inventors: Jun Takahashi, Miyagi-ken (JP); Ichiro Nakahara, Miyagi-ken (JP); Tetsuya Asada, Kanagawa-ken (JP); Teppei Nagano, Kanagawa-ken (JP)

(73) Assignees: Alps Electric Co., Ltd., Tokyo (JP); Nissan Motor Co., Ltd., Kanagawa (JP)

( * ) Notice: Subject to any disclaimer, the term of this patent is extended or adjusted under 35 U.S.C. 154(b) by 114 days.

(21) Appl. No.: 10/365,688

(22) Filed: Feb. 12, 2003

(65) Prior Publication Data

US 2004/0024476 A1 Feb. 5, 2004

(30) Foreign Application Priority Data

Feb. 15, 2002 (JP) ............................ 2002-038885

(51) Int. Cl.
*B60R 25/00* (2006.01)
*G05B 19/00* (2006.01)
*G06F 7/00* (2006.01)
*G08B 29/00* (2006.01)
*H04B 1/00* (2006.01)

(52) U.S. Cl. .................................... 340/5.71; 340/5.72

(58) Field of Classification Search ................. 340/5.7, 340/5.72, 5.62, 825.69, 825.72, 5.61, 5.63, 340/10.1, 10.3, 10.4, 10.5, 426.13, 426.14, 340/426.35

See application file for complete search history.

(56) References Cited

U.S. PATENT DOCUMENTS

| | | | | | |
|---|---|---|---|---|---|
| 4,672,375 | A | * | 6/1987 | Mochida et al. | 340/5.72 |
| 5,844,517 | A | * | 12/1998 | Lambropoulos | 341/176 |
| 5,945,906 | A | * | 8/1999 | Onuma | 340/5.62 |
| 6,317,035 | B1 | | 11/2001 | Berberich et al. | |
| 6,633,227 | B1 | * | 10/2003 | Schmitz | 340/10.31 |
| 6,747,545 | B2 | * | 6/2004 | Nowottnick et al. | 340/5.61 |
| 6,747,546 | B1 | * | 6/2004 | Hikita et al. | 340/10.31 |

FOREIGN PATENT DOCUMENTS

| | | |
|---|---|---|
| DE | 198 41 514 | 4/1999 |
| EP | 0 765 984 | 4/1997 |

(Continued)

*Primary Examiner*—Michael Horabik
*Assistant Examiner*—Nam Nguyen
(74) *Attorney, Agent, or Firm*—Brinks Hofer Gilson & Lione

(57) ABSTRACT

A vehicle-mounted unit includes a controller which changes a setting of a search method of portable units between a simple search method which is based on sending/receiving of simple search signals and simple response signals and an individual search method which is based on sending/receiving of normal search signals and normal response signals, and an ID-storage part which updates and stores the ID of the portable unit authenticated at a latest time as the latest authenticated ID. When the latest authenticated ID is stored in the ID-storage part, the controller searches the portable unit having the latest authenticated ID by priority and by the individual search method.

8 Claims, 9 Drawing Sheets

FOREIGN PATENT DOCUMENTS

| | | |
|---|---|---|
| EP | 0 955 217 | 11/1999 |
| EP | 1 142 764 | 10/2001 |
| GB | 2 307 514 | 5/1997 |
| GB | 2 340 692 | 2/2000 |
| GB | EP 1 079 053 | 2/2001 |
| JP | 2000-104429 | 4/2000 |
| JP | 2000-204809 | 7/2000 |
| JP | 2001-336328 | 12/2001 |
| JP | 2002-81248 | 3/2002 |
| JP | 2002-188341 | 7/2002 |

* cited by examiner

FIG. 4

CURRENTLY IN AN UNLOCK STATE

| IS THERE A PORTABLE UNIT IN THE VEHICLE? | IS THERE A PORTABLE UNIT OUTSIDE THE VEHICLE? | CONTROL SIGNAL |
|---|---|---|
| YES | YES | WARNING |
| | NO | WARNING |
| NO | YES | LOCK |
| | NO | — |

CURRENTLY IN A LOCK STATE

| IS THERE A PORTABLE UNIT IN THE VEHICLE? | IS THERE A PORTABLE UNIT OUTSIDE THE VEHICLE? | CONTROL SIGNAL |
|---|---|---|
| YES | YES | — |
| | NO | — |
| NO | YES | UNLOCK |
| | NO | — |

VEHICLE-MOUNTED DEVICE COMMUNICATION CONTROLLER

BACKGROUND OF THE INVENTION

1. Field of the Invention

The present invention relates to a vehicle-mounted device communication controller, and more particularly to a vehicle-mounted device communication controller capable of searching the existence of portable units promptly and with a high degree of accuracy by sending/receiving signals between a vehicle-mounted unit and a plurality of portable units.

2. Description of the Related Art

Conventionally, for vehicle-mounted device communication controllers which are used mounted in automotive vehicles, the controllers having a passive keyless entry function have been known. A vehicle-mounted device communication controller of this type is provided with a vehicle-mounted unit, and necessary information is exchanged by the communication using radio signals between the vehicle-mounted unit and one or more portable unit to be carried by the user. As an example of the communication performed at this time, the vehicle-mounted unit sends a low-frequency radio signal to each of the portable units as a search signal intermittently, when any one of the portable units receives this search signal, the received portable unit sends back a response signal, and when the vehicle-mounted unit receives this response signal, the communication is established between the vehicle-mounted unit and the portable unit. Then when the communication is established between the vehicle-mounted unit and the portable unit, the vehicle-mounted unit authenticates the portable unit, which is the communication opponent, that the portable unit is an ID registered normal portable unit. After such an authentication is performed, in the vehicle-mounted device communication controller, the passive keyless entry system changes the setting of the door-locking mechanism from a lock state to an unlock state in order to enable the user (vehicle operator) and the like to open the door freely.

In this regard, the communication performed between the vehicle-mounted unit and the portable unit is carried out timely after the setting of the door-locking mechanism have having changed, and the checking is performed of whether the portable unit exists within a predetermined range outside from the vehicle or in the vehicle.

In the above-described conventional technique, the above-described search signal and response signal are the signals which include a different ID for each portable unit and various other signal parts, and are relatively long signals. Therefore, there has been a problem in that it takes too much time to perform the communication with all the portable units by exchanging individual search signals and response signals for individual portable units in sequence continuously until the communication is completed.

SUMMARY OF THE INVENTION

The present invention is made in view of such a technical background, and an object is to provide a vehicle-mounted device communication controller which can selectively search the existence of a portable unit promptly or with a high degree of accuracy when sending/receiving search signals and response signals between a vehicle-mounted unit and a plurality of portable units.

In order to solve the above-described problem, according to the present invention, there is provided a vehicle-mounted device communication controller which includes a vehicle-mounted unit for communicating with a plurality of ID-registered portable units and a controlled equipment installed in a vehicle, and in which a search signal and a response signal are sent and received between the vehicle-mounted unit and the portable units, one of the portable unit is authenticated among the portable units by the vehicle-mounted unit, and the controlled equipment specified by the authenticated portable unit is controlled, wherein the vehicle-mounted unit includes a controller which changes a setting of a search method of portable units between a simple search method which is based on sending/receiving of a simple search signal and a simple response signal and an individual search method which is based on sending/receiving of a normal search signal and a normal response signal, and an ID-storage part which updates and stores an ID of the portable unit authenticated at a latest time as a latest authenticated ID, and when the latest authenticated ID is stored in the ID-storage part, the controller searches for the portable unit having the latest authenticated ID by priority and by the individual search method.

By the above-described means, for a search method of a portable unit performed by the vehicle-mounted unit, the simple search method which is based on the simple search signal and simple response signal is usually performed, thus prompt search is possible, and when the latest authenticated ID is stored in the ID-storage part, the individual search, which is based on the normal search signal and the normal response signal, is performed for the portable unit having the latest authenticated ID by priority, thus searching can be performed promptly and with a high degree of accuracy.

In this case, when the controller cannot authenticate any of the plurality of portable units as a result of a search performed by a simple search method at the beginning, and the latest authenticated ID is stored in the ID-storage part, the controller may preferably search the portable unit having the latest authenticated ID by priority and by the individual search method.

With this arrangement, when any of the plurality of portable units cannot be authenticated by searching the portable unit using the simple search method which does not relatively take long time, in order to cope with the fact that a communication error might occur in the simple search method because of its simplicity, searching can be performed promptly and with a high degree of accuracy by switching to the individual search method using the normal search signal and the normal response signal with a high degree of accuracy, and by performing individual search by priority for the portable unit having the latest authenticated ID in the ID-storage part and thus having the highest probability of existence.

Also, in the above-described method, the simple search signal and the simple response signal used for the simple search method may be an abbreviated search signal and an abbreviated response signal, each of which does not include the ID, respectively, and at least one of the normal search signal and the normal response signal used for the individual search method may preferably include the ID.

With this arrangement, when searching the portable unit by the simple search method, the vehicle-mounted unit uses an abbreviated simple search signal which does not include an ID, and the portable unit side uses an abbreviated simple response signal which does not include an ID, thus the time required for sending/receiving the simple search signal and the simple response signal is shortened, and thus it becomes possible to perform searching the portable unit promptly.

Also, when searching the portable unit by the individual search method, at least one of the normal search signal and the normal response signal, particularly, the normal response signal adopts a format including an ID, thus a search accuracy of the portable unit improves, and thus it becomes possible to search the portable unit with a high degree of accuracy.

Also, in the above-described means, the latest authenticated ID may preferably be the an ID of a portable unit authenticated in the vehicle at a least time.

With this arrangement, when determining whether or not the portable unit exists in the vehicle, the vehicle-mounted unit can search the portable unit having the latest authenticated ID stored in the ID-storage part, which has the highest probability of existence, at the beginning, and thus it becomes possible to complete searching promptly.

Alternatively, in the above-described means, the latest authenticated ID may preferably be an ID authenticated at a latest lock/unlock time.

With this arrangement, the portable unit having the latest authenticated ID stored in the ID-storage part, which has the highest probability of existence at a lock or unlock control time can be searched at the beginning, and thus it becomes possible to complete the searching promptly.

BRIEF DESCRIPTION OF THE DRAWINGS

FIG. 4 is a diagram illustrating conditions related to the flowchart in FIG. 3;

DESCRIPTION OF THE PREFERRED EMBODIMENT

In the following, an embodiment of the present invention will be described with reference to the drawings.

Figure 1:
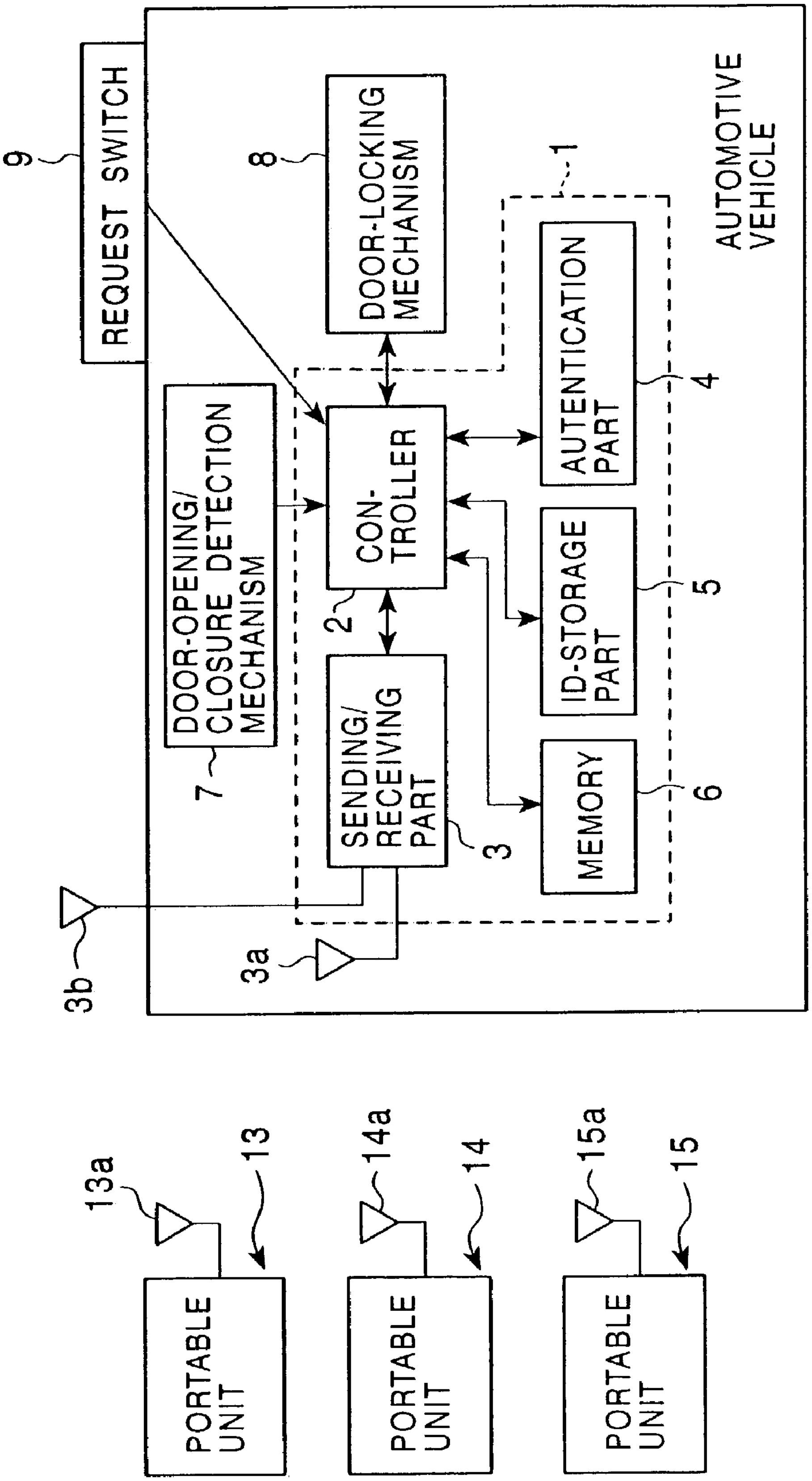
FIG. 1 illustrates a vehicle-mounted device communication controller according to an embodiment of the present invention, and is a block diagram showing the configuration of the essential parts of the controller.

FIG. 1 illustrates a vehicle-mounted device communication controller according to an embodiment of the present invention, and is a block diagram showing the configuration of the essential parts of the controller.

As shown in FIG. 1, the vehicle-mounted device communication controller according to this embodiment has a vehicle-mounted unit 1 which is mounted in an automotive vehicle (not denoted by a reference numeral). The vehicle-mounted unit 1 includes a controller 2 which totally controls each part and changes the setting of a search method of a plurality of portable units 13, 14, and 15 described below, a sending/receiving part 3 which is connected to a sending/receiving antenna 3*a* installed in the vehicle and a sending/receiving antenna 3*b* installed outside the vehicle and which sends search signals and receives response signals, an authentication part 4 which authenticates the portable unit which has established communication, an ID-storage part 5 which updates and stores the latest authentication ID, and a memory 6 in which IDs of the portable units 13, 14, and 15 are registered.

Also, the vehicle-mounted device communication controller according to this embodiment includes a door-open/closure detection mechanism 7, a door-locking mechanism 8, individually installed in a vehicle, and a request switch 9 installed on a part of the external surface of a door. Furthermore, the controller includes the portable units 13, 14, and 15, each of which internally has the sending/receiving antennas 13*a*, 14*a*, and 15*a*, respectively.

In this case, the door-opening/closure detection mechanism 7 detects that a door, particularly a vehicle operator's side door, is opened and that the door is closed subsequently, and supplies the detection signal to the controller 2. When the control signal is supplied from the controller 2, the door-locking mechanism 8 operates so as to set and release a door-locking state, that is, to lock and unlock. When the vehicle operator operates the request switch 9, the controller 2, which has received the switch signal, searches a normal portable unit in the vehicle and outside the vehicle, and supplies a locking or an unlocking control signal to the door-locking mechanism 8.

Figure 2:
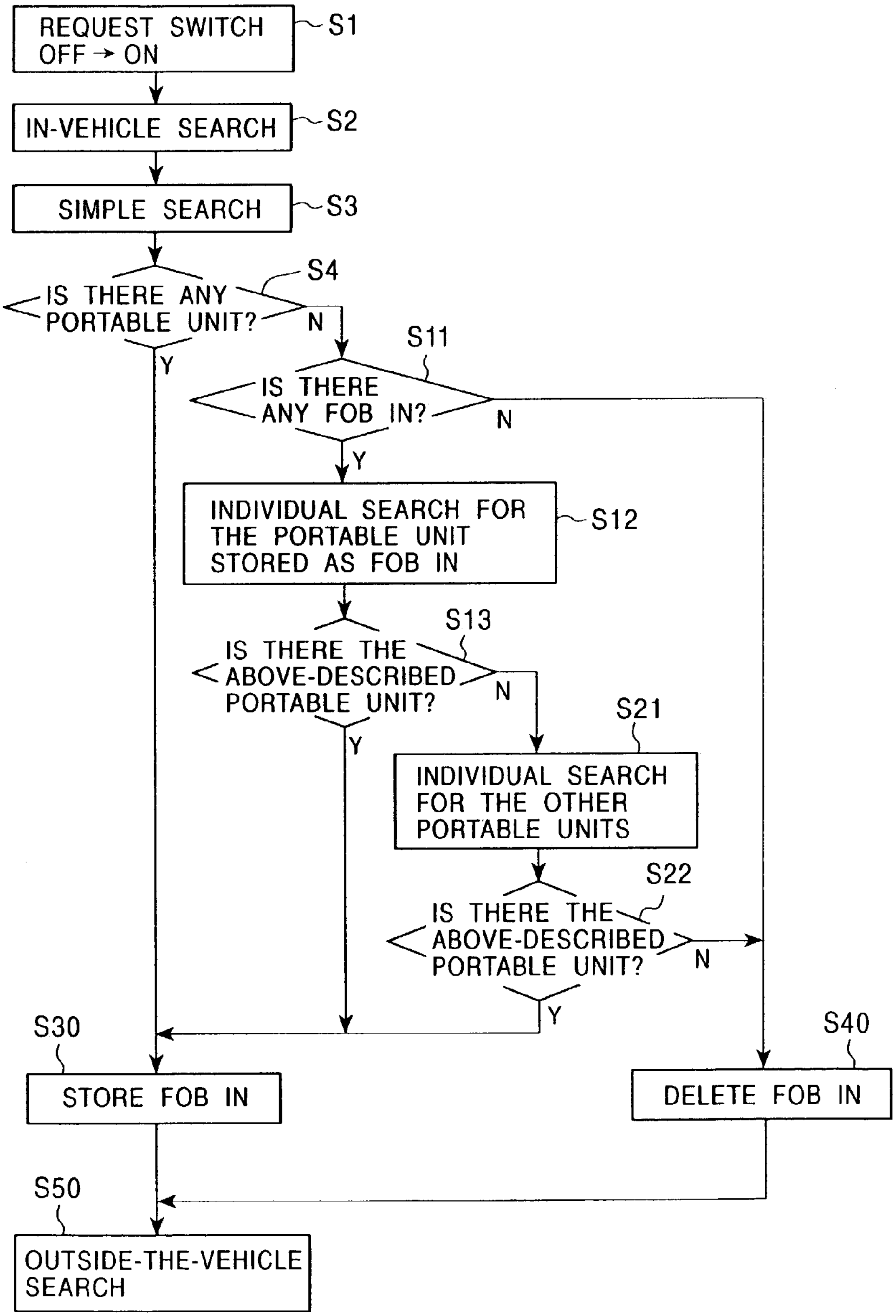
FIG. 2 is a flowchart illustrating an example of an operation process executed in the vehicle-mounted device communication controller shown in FIG. 1.
Figure 3:
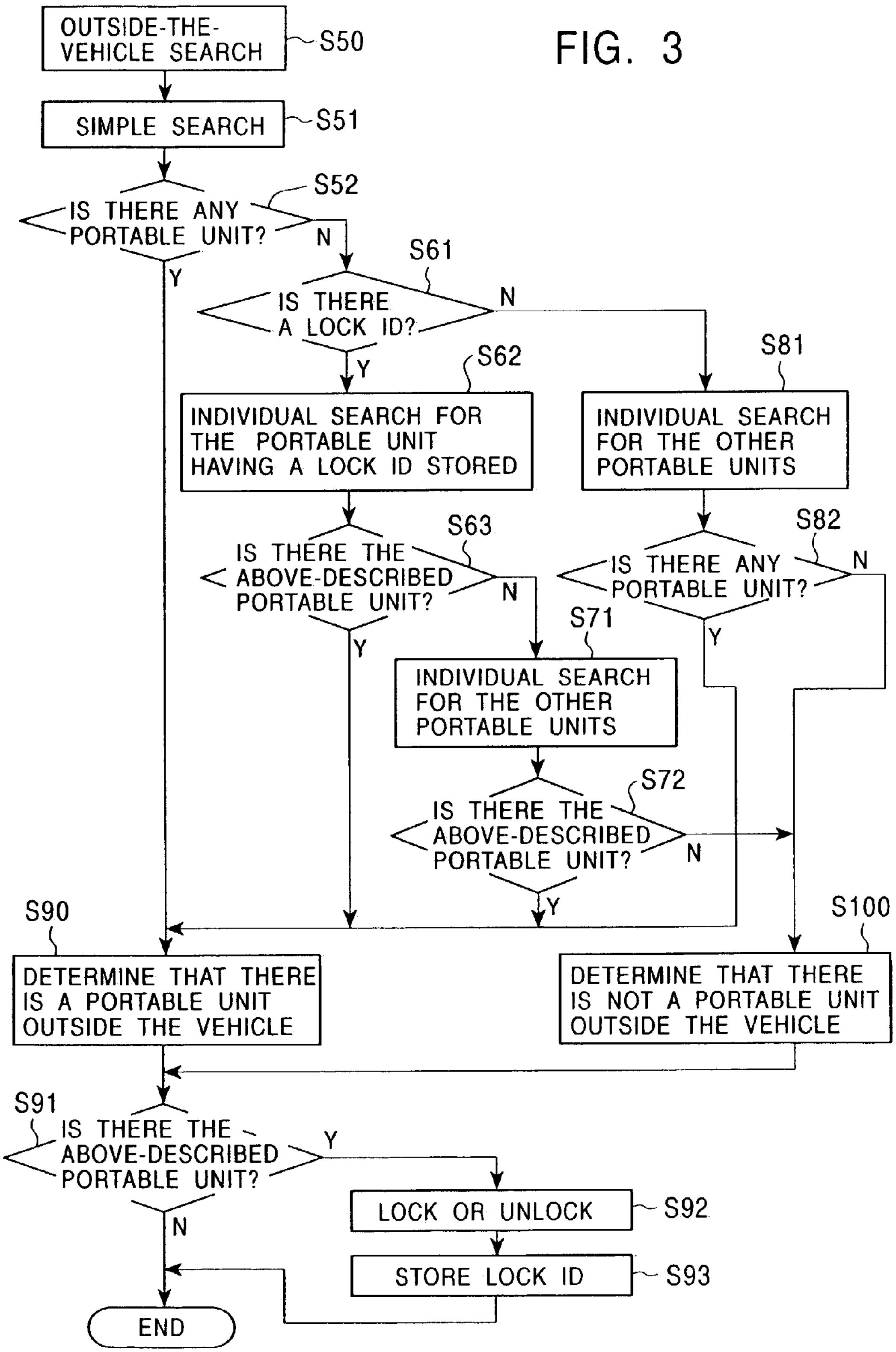
FIG. 3 is a flowchart illustrating a subsequent part of the flowchart shown in FIG. 2.
Figure 5:
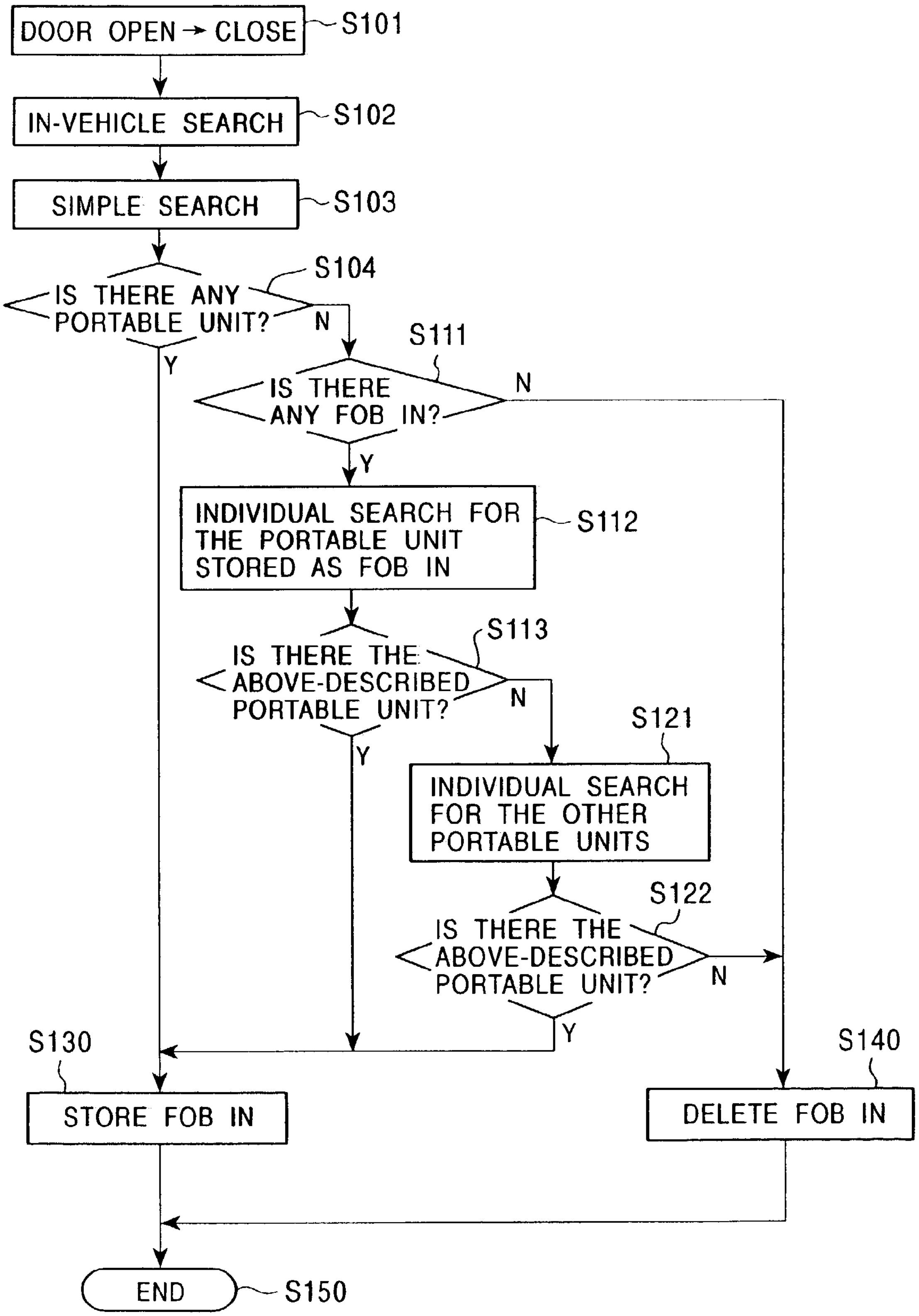
FIG. 5 is a flowchart illustrating another example of an operation process executed in the vehicle-mounted device communication controller shown in FIG. 1.

Next, FIGS. 2 to 4 are flowcharts illustrating an example of the operation process executed in the vehicle-mounted device communication controller shown in FIG. 1. FIGS. 2 and 3 illustrate a series of operation process from the time when the vehicle operator approaches a vehicle in its door-locked state, and operated the request switch 9 on the external surface of the door until the locked door-locking mechanism 8 is unlocked, or a series of operation process from the time when the vehicle operator goes out from a vehicle and operated the request switch 9 until the unlocked door-locking mechanism 8 is locked. FIG. 5 illustrates a series of operation process of searching a portable unit in the vehicle when the door-opening/closure detection mechanism 7 detects the door-opening/closure which are caused by the operation of door-opening and then closing by the vehicle operator.

A description will be given of the operation of the vehicle-mounted device communication controller according to this embodiment in accordance with the flowcharts shown in FIGS. 2 and 3.

This operation process is roughly divided into an in-vehicle search and an outside-vehicle search which follows the in-vehicle search, and further includes a step which controls locking or unlocking of the door-locking mechanism 8 by checking the in-vehicle search result and outside-vehicle search result after the outside-the-vehicle search.

In step S1, when the request switch 9 is operated, the operation signal is supplied to the controller 2, and then the controller 2 first searches the existence of a portable unit in the vehicle (step S2).

In step S3, the controller 2 searches a portable unit by the simple search method at first through the sending/receiving antenna 3*a* in the vehicle. In this regard, a description will be given of the simple search method later. An object of searching by the simple search method in this step is to check the existence of any one of the portable units promptly by the exchange of the abbreviated simple search signal and simple response signal.

Next, in step S4, the controller 2 determines whether or not there is any one of the portable units 13, 14, and 15 in the vehicle. Then if it is determined that there is any one of the portable units, for example, the portable unit 14 in the vehicle (Y), the processing goes to step S30, and if it is determined that there is not any portable unit (N), the processing goes to step S11.

In step S30, the controller 2 stores the ID of the portable unit determined to be in the vehicle, for example, here, stores the ID of the portable unit 14 in the ID-storage part 5 as the latest authenticated ID, and then the processing proceeds to step S50. A description will be given of the outside-the-vehicle search later. In this regard, in the flowchart, the latest authenticated ID of the portable unit in a vehicle is represented by "FOB IN".

In step S11, the controller 2 checks whether "FOB IN", that is, the latest authenticated ID in the vehicle is stored in the ID-storage part 5. As a result, if "FOB IN" is stored (Y), the processing goes to step S12, "individual search for the portable unit stored as FOB IN", and otherwise, that is, if "FOB IN" is not stored (N), the processing goes to step S40, "delete FOB IN".

In step S12, the controller 2 reads "FOB IN" stored in the ID-storage part 5, that is, the latest authenticated ID of the portable unit in the vehicle, and searches for the portable unit by the individual search method. A description will be given of this individual search method later.

In step S13, the controller 2 determines whether or not there is the portable unit stored as "FOB IN" in the vehicle. If there is the portable unit (Y), the processing goes to step S30, "FOB IN storage" step, stores the ID of the searched portable unit in the ID-storage part 5 as "FOB IN" (the latest authenticated ID), and the processing goes to step 50, outside-the-vehicle search. If it is determined that there is not the portable unit stored as "FOB IN" in the vehicle (N), the processing goes to step S21, "individual search for the other portable units".

The operations from step S11 to step S13 have the following object: A search result of a portable unit in the vehicle has a great effect on the control of locking and unlocking of the door-locking mechanism 8. Specifically, when the vehicle operator operated the request switch 9 on the external surface of the door in the unlocked state of the door-locking mechanism 8, it is considered that the vehicle operator is outside the vehicle and tries to lock the door-locking mechanism 8. At this time, if there is a portable unit in the vehicle, it is determined that the vehicle operator mistakenly left the portable unit in the vehicle, so that, in that case, the door-locking mechanism 8 is not locked as described later, and a warning is sounded simultaneously to warn the vehicle operator. Furthermore, when the vehicle operator having an portable unit gets in the vehicle, and locks the door-locking mechanism 8 in the vehicle, and then the request switch 9 outside the vehicle is operated by a third person, that is, when the request switch 9 outside the vehicle is operated at a time when the portable unit exists in the vehicle and the door-locking mechanism 8 is locked, the door-locking mechanism 8 is formed not to be unlocked. However, the searching by the simple search method in steps S3 to S4 can be performed promptly because it is simple, but at the same time, a communication error might occur by the method. Therefore, there is a possibility that although there is a portable unit in the vehicle, the searching fails and a determination is made that there is not a portable unit. If any one of the portable units is found by the searching using the simple search method, a prompt search can be carried out in a short time as a result. However, it is necessary to consider that the above-described error might occur. Thus, the object of the operations in steps from S11 to S13 is to check that there is not a portable unit in the vehicle without fail by performing the search using the individual search method having a high degree of accuracy when none of the portable units is found, and furthermore, to search the existence of the portable unit having "FOB IN" stored, that is, to search, at the beginning, the portable unit which has existed in the vehicle just a while ago in the vehicle.

In step S21, the controller 2 performs, in sequence, the search by the individual search method for the portable unit which is not stored as "FOB IN".

In step S22, the controller 2 determines whether or not there is the portable unit in the vehicle as a result of the search in step S21. If it is determined that there is the portable unit (Y), the processing goes to step S30, "FOB IN" is stored in the ID-storage part 5, and then the processing goes to step S50, outside-the-vehicle search. If it is determined that there is not the portable unit (N), the processing goes to step S40, "delete FOB IN".

In step S40, the content of the ID-storage part 5 is cleared, and the processing goes to the next step S50, outside-the-vehicle search.

The search begins by the simple search method from step S2 and ends at step S22. While considerable time is required until the processing completes in step S22, when the portable unit is left in the vehicle, the portable unit is usually found by the search using the simple search method. If it is not found by the search using the simple search method, it can be found by the search using the individual search method for the portable unit having "FOB IN" stored.

Next, a description will be given of the operation process subsequent to the outside-the-vehicle search with reference to FIG. 3. The outside-the-vehicle search is performed through the sending/receiving antenna 3*b* directed outside the vehicle. Also, in the following description, "exist outside the vehicle" means within a predetermined range outside the vehicle, that is, the portable unit exists within a predetermined distance capable of communication from the sending/receiving antenna 3*b,* and does not mean that it exists out of a predetermined range outside the vehicle.

In step S51, the controller 2 searches a portable unit by the simple search method at the beginning. In this regard, a description will be given of the simple search method later. The object of searching by the simple search method in this step is, as described in the above-described step S3, to check the existence of any one of the portable units promptly by communication using abbreviated simple search signals and simple response signals.

Next, in step S52, the controller 2 determines whether or not there is any one of the portable units 13, 14, and 15 outside the vehicle as a result of searching a portable unit by the simple search method. Then if it is determined that there is one of the portable units outside the vehicle (Y), the processing goes to step S90, and if it is determined that there is no portable unit (N), the processing goes to step S61.

In step S90, when it is determined that there is a portable unit outside the vehicle, the controller 2 stores the data "There is a portable unit outside the vehicle" in the memory 6.

In step S61, the controller 2 checks whether or not the "lock ID", that is, the ID of the portable unit related to either of the control, the latest lock or unlock, is stored in the ID-storage part. As a result, when the "lock ID" is stored (Y), the processing goes to step S62, "individual search for the portable unit having a lock ID stored". When it is determined that the "lock ID" is not stored (N), the processing goes to step S81, "individual search for all portable units".

In step S62, the controller 2 reads the "lock ID" stored in the storage part 5, and searches for the portable unit by the individual search method. A description will be given of this individual search method later.

In step S63, the controller 2 determines whether or not there is the portable unit having the "lock ID" stored outside the vehicle. If it is determined that there is the unit (Y), the processing goes to the above-described step S90, and if it is determined that there is not the portable unit having the "lock ID" stored outside the vehicle (N), the processing goes to step S71, "individual search for the other portable units".

The object of operations in steps 61 to 63 is almost the same as the object of the operation process of steps from S11 to S13 described above, however, it is different in that "lock ID" is adopted in place of "FOB IN" as a structure. The "lock ID" in the outside-the-vehicle search is a preferable target of the search by the individual search method in the same manner as "FOB IN" in the in-vehicle search, because the portable unit related to the immediate lock and unlock is more likely to be related to the control of lock and unlock of this time.

In step S71, the controller 2 searches for the portable unit of which "lock ID" is not stored in sequence by the individual search method.

In step S72, the controller 2 determines whether or not there is a portable unit outside the vehicle as a result of the search in step S71. If it is determined that there is a portable unit (Y), the processing goes to step S90. If it is determined that there is not a portable unit (N), the processing goes to step S100.

In step S100, the controller 2 stores the data "there is not a portable unit outside the vehicle" in the memory 6.

In step S81, the controller 2 searches for all portable units in sequence by the individual search method.

In step S82, a determination is made whether or not there is a portable unit outside the vehicle as a result of an individual search for all the portable units by the individual search method. If it is determined that there is a portable unit (Y), the processing goes to step S90, and if it is determined that there is mot a portable unit (N), the processing goes to step S100.

The search of a portable unit outside the vehicle completes through steps from S50 to S90. Subsequently, in step S91, a selection is made from the lock control or the unlock control for the door-locking mechanism 8 based on the search result of the in-vehicle search and the outside-the-vehicle search. FIG. 4 is the table showing the conditions of this selection. In this table, the existence of a portable unit in the vehicle as a result of the in-vehicle search, the existence of a portable unit outside the vehicle as a result of the outside-vehicle search, and current state of the door-locking mechanism 8 are set as the conditions. The data of existence of a portable unit outside the vehicle is obtained by the controller 2's reading the data stored in the memory 6, "There is a portable unit outside the vehicle" or "There is not a portable unit outside the vehicle". The data of existence of a portable unit in the vehicle is obtained by the controller 2's reading "FOB IN" (the latest authenticated ID) stored in the ID-storage part 5. By corresponding to whether or not the ID is contained, that is, the data that a portable unit exists is obtained when there is the "FOB IN", and the data that a portable unit does not exist when there is not the "FOB IN". The state of locking of the door-locking mechanism 8 is supplied from the door-locking mechanism 8 to the controller 2.

When a current state, that is, at the time when the request switch 9 is operated, of the door-locking mechanism 8 is unlocked, and there is not a portable unit in the vehicle, but there is a portable unit outside the vehicle, the controller 2 supplies a lock-control signal to the door-locking mechanism 8. When there is a portable unit in the vehicle, the controller 2 warns the vehicle operator who operated the request switch 9 that the portable unit is left in the vehicle by sounding a warning using warning means not shown in the figure regardless of the existence of a portable unit outside the vehicle.

When the current state of the door-locking mechanism 8 is locked, if there is not a portable unit in the vehicle, and there is a portable unit outside the vehicle, the controller 2 supplies an unlock-control signal to the door-locking mechanism 8. When there is a portable unit in the vehicle, the controller 2 does not supply a signal to the door-locking mechanism 8 regardless of the existence of a portable unit outside the vehicle.

The reason of searching by the individual search method for the portable unit having the latest authenticated ID stored in the ID-storage part 5 in the above-described series of operation process is to check the existence of a portable unit promptly and with a high degree of accuracy by performing the highly accurate individual search for the portable unit in the vehicle. Also, the reason that the search by the simple search method is performed at the beginning and then the search by the individual search method is performed for the portable unit having the latest authenticated ID stored is to complete checking the existence of the portable unit in almost all the cases in a short time using the simple search method capable of searching in a short time, and to enable a prompt and highly accurate search on the whole by performing the above-described individual search method having a high degree of accuracy and promptness only in the case where no portable unit can be found by the simple search method in consideration of a communication error in the simple search method.

FIG. 5 is a flowchart showing the operation process in which searching is performed in the vehicle by the trigger that the door-open/closure-detection mechanism 7 detects opening of the door and subsequent closure of the door. The operations in steps S102 to S150 are the same as the operations of the in-vehicle search triggered by the signal of the request switch 9 shown in FIG. 2, and thus the description is omitted. As shown in FIGS. 2 and 5, even the triggers are different, in their operation process, the latest authenticated ID is updated whenever necessary, and the updated latest authenticated ID is used regardless of the difference of the trigger. As a result, it becomes possible to search portable units effectively in the vehicle-mounted device communication controller as a whole.

Figure 6:
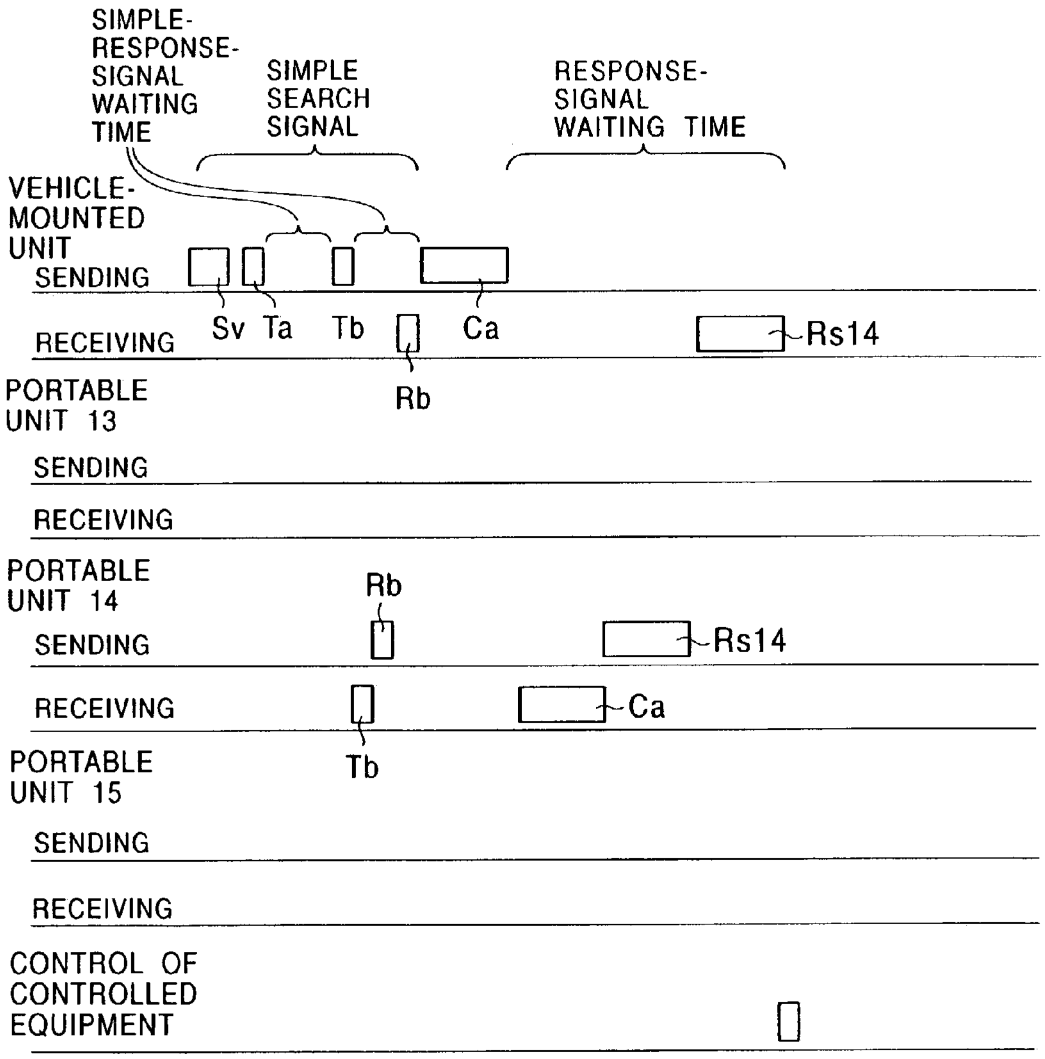
FIG. 6 is a diagram illustrating an example of an operation sequence at a signal-exchange time between the vehicle-mounted unit and the portable unit by a simple search method executed in the vehicle-mounted device communication controller shown in FIG. 1.
Figure 7:
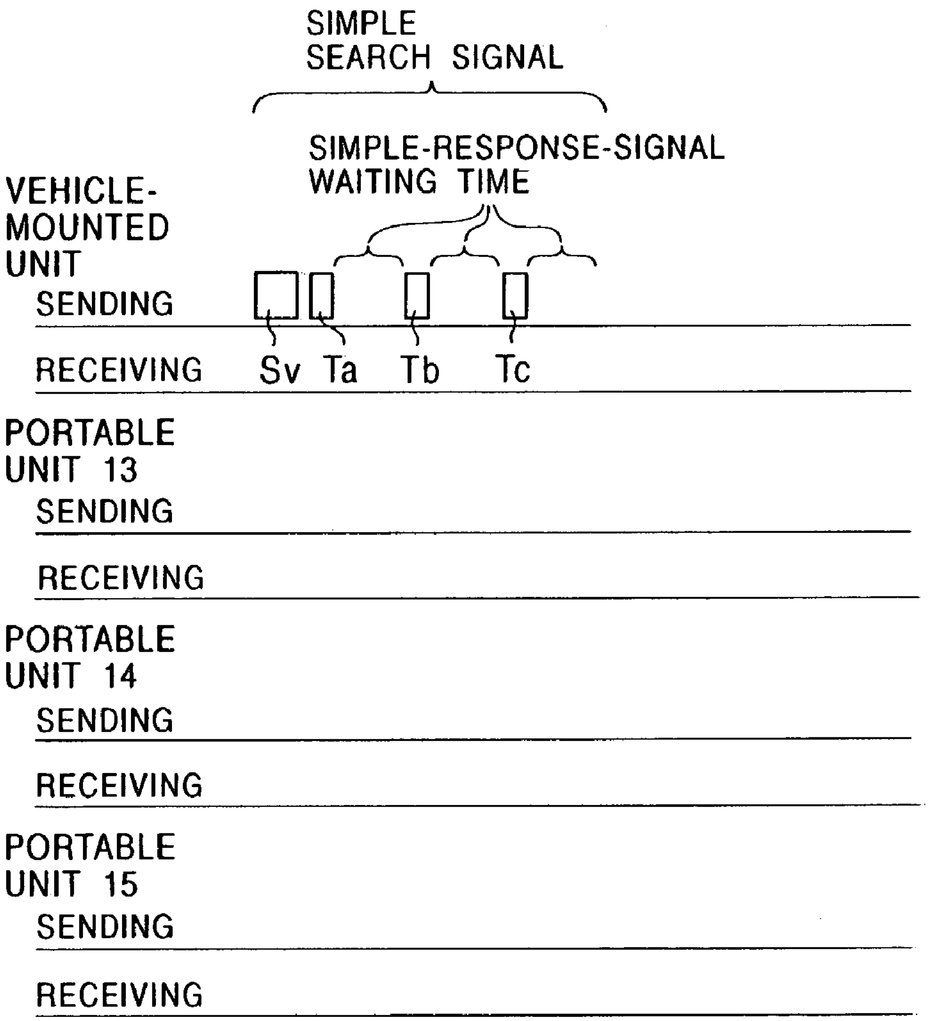
FIG. 7 is a diagram illustrating another example of an operation sequence at a signal-exchange time between the vehicle-mounted unit and the portable unit by a simple search method executed in the vehicle-mounted device communication controller shown in FIG. 1.

FIGS. 6 and 7 are diagrams illustrating examples of the operation sequence at a signal update time between the vehicle-mounted unit and the portable unit by the simple search method performed in the vehicle-mounted device communication controller shown in FIG. 1. FIG. 6 illustrates the case where communication is established between the searching vehicle-mounted unit and one of the plurality of portable units. FIG. 7 illustrates the case where the vehicle-mounted unit 1 failed to establish communication with any one of the portable units.

As shown in FIGS. 6 and 7, the vehicle-mounted unit 1 sends, at the beginning of the communication, a VID signal (Sv) indicating the start of the search signal, and the simple search signal which are arranged with the single pulses (Ta), (Tb), and (Tc) corresponding to the total number of portable units 13, 14, and 15 to be searched subsequently at intervals of a predetermined simple response-signal waiting time. Each of the portable units counts the number of single pulses, and when a portable unit receives the number assigned to itself, the portable unit sends the simple response signal composed of a single pulse. The portable unit 13 sends the simple response signal (Ra) when having received the VID signal (Sv) and the single pulse (Ta), the portable unit 14 sends the simple response signal (Rb) when having received the VID signal (Sv) and the single pulses (Ta) and (Tb), and the portable unit 15 sends the simple response signal (Rc) when having received the VID signal (Sv) and the single pulses (Ta), (Tb), and (Tc).

As described above, the simple search signal is composed by mainly outputting single pulses in series, the length of the signal is shortened as a whole, and the signal is a search signal which does not includes a particular ID for each portable unit. The simple response signal is composed of a single pulse, and is a further abbreviated response signal which does not include an ID.

At this time, as shown in FIG. 6, when the vehicle-mounted unit 1 sends the VID signal (Sv), the single pulse (Ta) for the portable unit 13, the single pulse (Tb) for the portable unit 14, and the single pulse (Tc) for the portable unit 15 in sequence, the portable unit 14 receives the single pulse (Tb) and sends the simple response signal (Rb) in response to it. When the vehicle-mounted unit 1 receives the simple response signal (Rb), the unit stops sending the single pulse (Tc) thereafter, and sends the challenge signal (Ca, normal search signal) immediately. After this, when the portable unit 14 receives this challenge signal (Ca), the portable unit 14 sends the response signal (Rs14, normal response signal). When the vehicle-mounted unit 1 receives the response signal (Rs), the communication between the vehicle-mounted unit 1 and the portable unit 14 is established.

The challenge signal (Ca) and the response signal (Rs14) include various signal parts to ensure communication, and are long signals as a whole. The response signal includes a particular ID for each portable unit, and thus is handled by distinguishing each of them, for example, (Rs13), (Rs14), and (Rs15). The vehicle-mounted unit 1 reads the ID from the received response signal, and authenticates the portable unit.

Then when the vehicle-mounted unit 1 checks that the portable unit is a regular portable unit as a result of authentication, the unit supplies a signal to control a controlled equipment, for example, the door-locking mechanism 8. Practically, the control signal is supplied through the operation process shown by the flowcharts in FIGS. 2 and 3. FIG. 6 illustrates the part of supplying the control signal conceptually.

FIG. 7 illustrates the case where when the vehicle-mounted unit 1 has sent the VID signal (Sv), the single pulse (Ta) for the portable unit 13, the single pulse (Tb) for the portable unit 14, and the single pulse (Tc) for the portable unit 15 in sequence, and the simple response signal waiting time has passed, but the vehicle-mounted unit 1 has not received the simple response signal from any of the portable units, the search by the simple search method is completed at that time.

Figure 8:
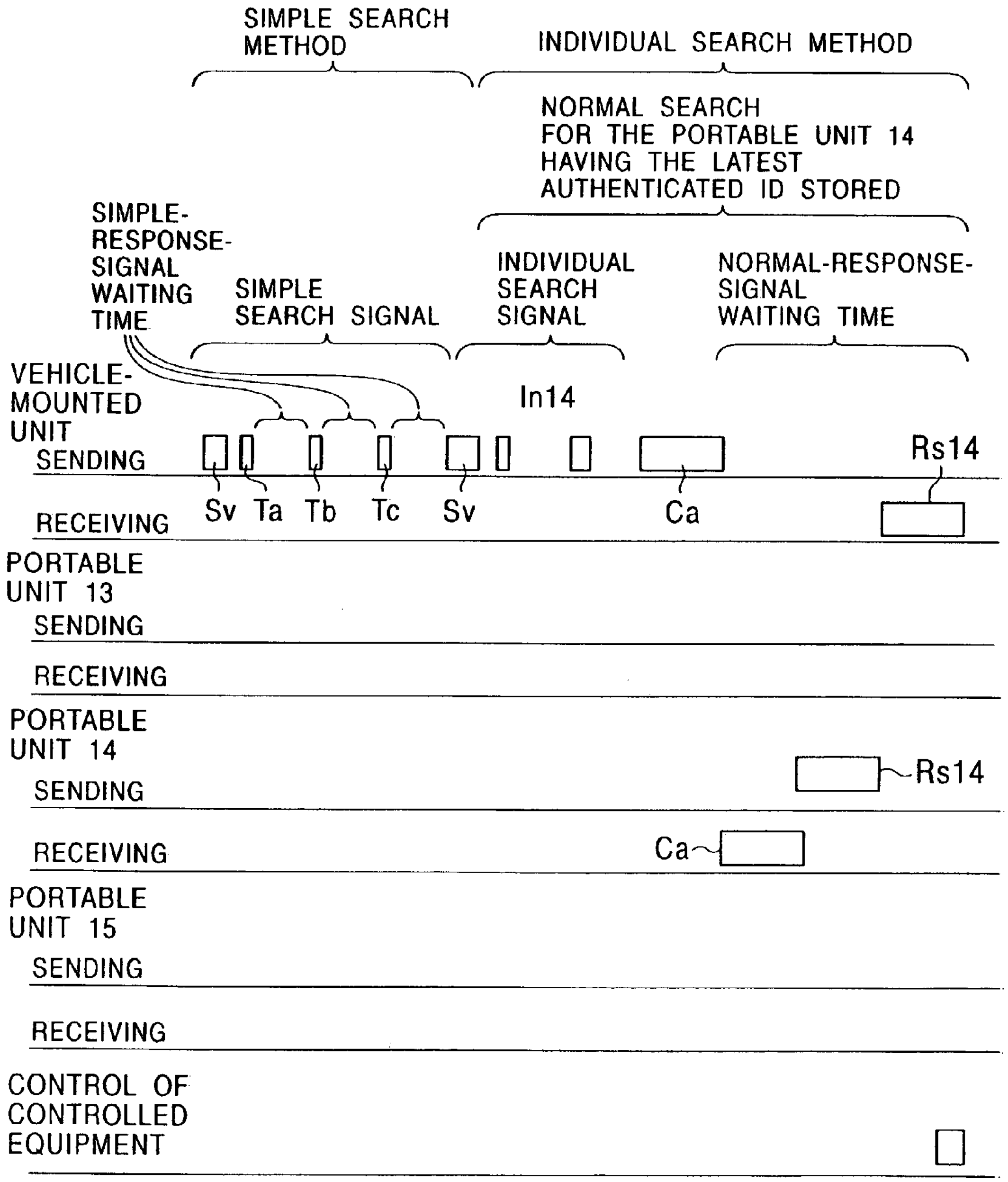
FIG. 8 is a diagram illustrating an example of an operation sequence at a signal-exchange time between the vehicle-mounted unit and the portable unit by an individual search method executed in the vehicle-mounted device communication controller shown in FIG. 1.

FIG. 8 is an example of the operation sequence at the time of the signal exchange, by the individual search method, between the vehicle-mounted unit 1 and the portable units 13, 14, and 15 for the portable unit having the latest authenticated ID stored in the ID-storage part 5, and is performed in the vehicle-mounted device communication controller shown in FIG. 1. FIG. 8 illustrates the subsequent process to the step where the communication has not been established with any one of the portable units in the search by the simple search method following the flowchart in FIG. 2. In reality, a determination is made whether or not the latest authenticated ID is stored in the ID-storage part 5 between both of the search methods, and the communication by the individual search method is performed when the latest authenticated ID is stored.

In FIG. 8, the normal search signal in the individual search method has the individual search signal which comprises the VID signal (Sv) indicating the beginning of the signal and the individual search signal composed of different number of single pulses for each portable unit, in this example, the individual search signal for the portable unit 14 (In14), and the subsequent challenge signal (Ca) fixedly in series. The format of the normal search signal is similar to the simple search signal in the simple search method, however, the function is apparently different in the point that the individual search signal of the normal search signal does not accept the simple response signal returned from the portable unit corresponding to the individual single pulses, and in the point that the challenge signal (Ca) is fixedly included, whereas the challenge signal (Ca) is not in the simple search signal. Also, the challenge signal (Ca) is sent regardless of whether the simple search signal is received from the portable unit to be the target of the individual search.

In FIG. 8, the portable unit 14 sends the response signal (Rs14) against the challenge signal (Ca) of the normal search signal for the portable unit 14, and the vehicle-mounted unit 1 receives this response signal (Rs14) to establish the communication. The subsequent operation has the same content as described in the description of FIG. 6, and thus the description is omitted.

Figure 9:
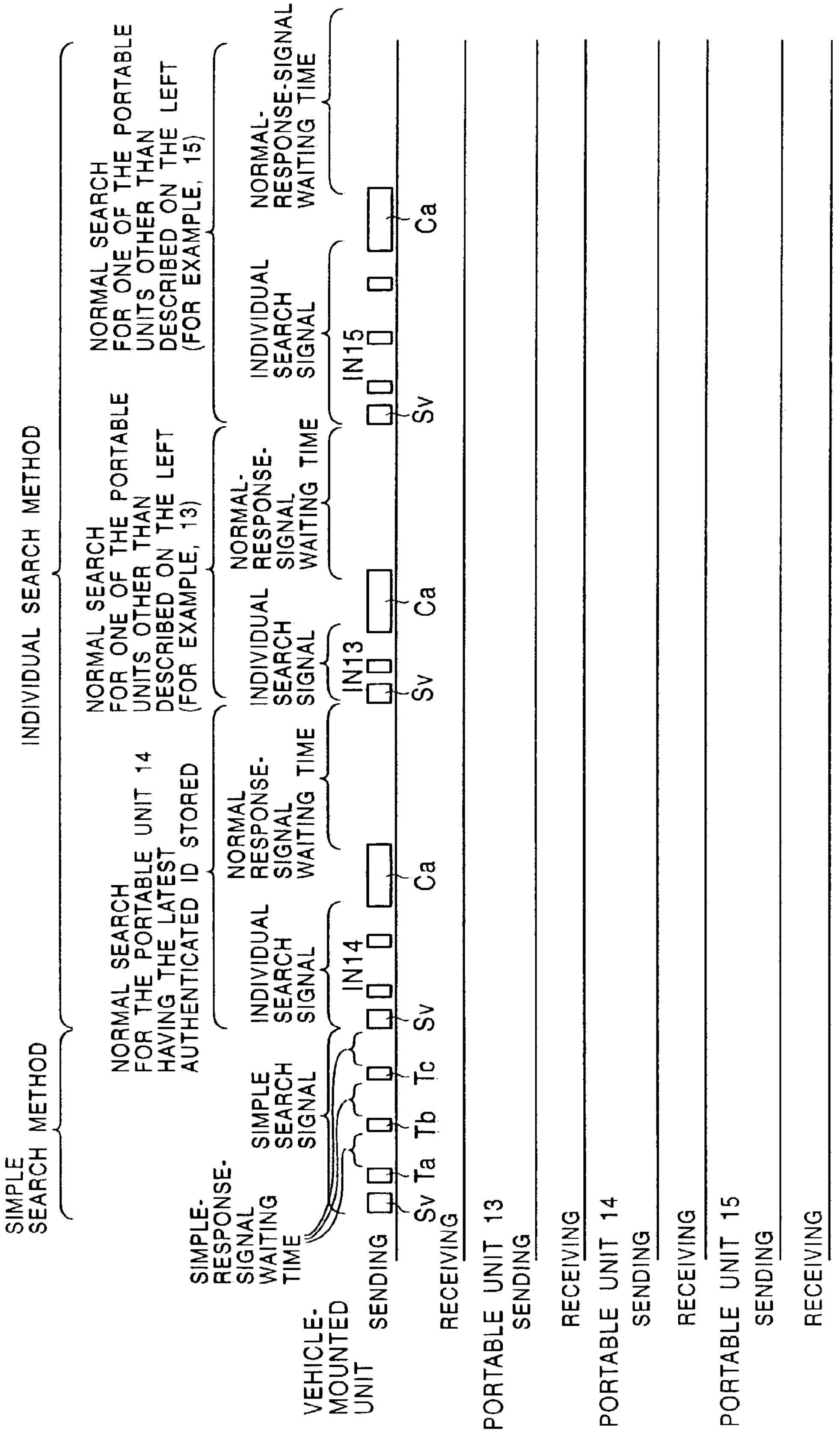
FIG. 9 is a diagram illustrating another example of an operation sequence at a signal-exchange time between the vehicle-mounted unit and the portable unit by an individual search method executed in the vehicle-mounted device communication controller shown in FIG. 1.

FIG. 9 illustrates the case where when the communication is not established with the portable unit 14 in the search, shown in FIG. 8, by the individual search method for the portable unit 14 having the latest authenticated ID stored, and further the searches for the other portable units 13 and 15 are performed, however, the communication is not established with any one of the portable units. In this example, the same operation processing as that in the example shown in FIG. 8 is performed except that the normal search signal for the portable unit 13 includes the individual search signal (In13) including one single pulse, and that the normal search signal for the portable unit 15 includes the individual search signal (In15) including three single pulses, and thus the detailed description is omitted.

As described, in the search by the simple search method shown in FIGS. 6 and 7, the searches for all the portable units are possible by the communication using the abbreviated simple search signals and simple response signals, and thus prompt search is possible. Also, in the search by the individual search method shown in FIGS. 8 and 9, the normal search signal includes the individual search signal and the challenge signal fixedly, and the communication with the portable unit is performed by the exchange of the challenge signal and the response signal, and thus the reliability of the search is high. Also, among the search by the individual search method, the individual search for the portable unit having the latest authenticated ID stored in the ID-storage part 5 enables the search having both promptness and reliability. Furthermore, when the search by the simple search method is performed and then the individual search for the portable unit having the latest authenticated ID stored is performed, it becomes possible to search more promptly and with a high degree of accuracy.

In the above description, the authenticated portable unit ID is stored in the ID-storage part 5 as the latest authenticated ID in each case. Then the latest authenticated ID is used for performing prompt and highly accurate individual search method through the operation process shown in FIGS. 2 to 4 and 8.

Also, the operation of the individual search using the latest authenticated ID shown in FIG. 8 can replace the individual search using the lock ID in the portable unit outside the vehicle shown in FIG. 3. In other words, this method is related to the search of a portable unit in the vehicle, the search of a portable unit outside the vehicle, furthermore, the control of the door-locking mechanism 8, and useful for these operations. However, the use is not limited to these, and the method is useful for controlling the other various controlled equipment. Also, the present invention is not limited by the embodiment exemplified, but can be applicable to various embodiments.

As described above, by the present invention, as the portable unit search method performed by the vehicle-mounted unit, the vehicle-mounted unit includes a controller which changes a setting of a search method between a simple search method based on sending/receiving of simple search signals and simple response signals and an individual search method based on sending/receiving normal search signals and normal response signals, and an ID-storage part which updates and stores the ID of the portable unit authenticated at a latest time as the latest authenticated ID, and when the ID is stored in the ID-storage part, the controller searches for a portable unit having the ID by priority by the individual search method. Thus the above-described search method has the effect that it becomes possible to search the portable units promptly and with a high degree of accuracy. Also, when the controller cannot authenticate any of the plurality of portable units as a result of a search performed by the simple search method at the beginning, and, at the same time, an ID is stored in the ID-storage part, the controller searches the portable unit having the ID by priority and by the individual search method. Thus the above-described search method has the effect that it becomes possible to search the portable units promptly and with a high degree of accuracy on the whole. Also, when the above-described search method is used for the control of the door-locking mechanism, it has the effect that preferable control becomes possible, for example, a warning can be given when a portable unit is left behind.

What is claimed is:

1. A vehicle-mounted device communication controller which includes a vehicle-mounted unit for communicating with a plurality of ID-registered portable units and a controlled equipment installed in a vehicle, and in which first and second search signals and first and second response signals are sent and received between the vehicle-mounted unit and the plurality of portable units, one of the plurality of portable units is authenticated from among the plurality of portable units by the vehicle-mounted unit, and the controlled equipment specified by the authenticated portable unit is controlled, wherein the vehicle-mounted unit includes a controller which changes a setting of a search method of portable units between a simple search method which is based on sending/receiving of the first search signals and the first response signals and an individual search method which is based on sending/receiving of the second search signals and second response signals to determine the presence of at least one of the plurality of the portable units and establish a communication between the present portable unit and the vehicle-mounted unit, and an ID-storage unit which updates and stores an ID of one of plurality of the portable units authenticated at a latest time as a latest authenticated ID, and when the latest authenticated ID is stored in the ID-storage unit, the controller searches for the portable unit having the latest authenticated ID using the individual search method starting with the second signals corresponding to the latest ID authenticated portable unit, and wherein, in the simple search method, the authentication is sequentially performed on the plurality of portable units.

2. A vehicle-mounted device communication controller according to claim 1, wherein when the controller fails to authenticate at least one of the plurality of portable units as a result of a search performed by the simple search method, and the latest authenticated ID is stored in the ID-storage unit, the controller searches for the portable unit having the latest authenticated ID using the individual search method starting with sending the second signals corresponding to the latest ID authenticated portable unit.

3. A vehicle-mounted device communication controller according to claim 1, wherein the first search signal and the first response signal used for the simple search method are an abbreviated search signal and an abbreviated response signal, each of which does not include the ID, respectively, and at least one of the second search signal and the second response signal used for the individual search method includes the ID.

4. A vehicle-mounted device communication controller according to claim 1, wherein the latest authenticated ID is an ID of a portable unit authenticated in the vehicle at a latest time.

5. A vehicle-mounted device communication controller according to claim 1, wherein the latest authenticated ID is an ID authenticated at as latest lock/unlock time.

6. A vehicle-mounted device communication controller according to claim 1, wherein a start signal indicating a start of the simple and individual search methods, and the first search signal which is arranged with a plurality of single pulses corresponding to the plurality of portable units to be searched, the plurality of single pulses being staggered at intervals of a predetermined fist response-signal waiting time.

7. A vehicle-mounted device communication controller according to claim 1, one of the plurality of portable units responds to the controller by sending a corresponding first response signal after receiving the start signal and the corresponding first search signal.

8. A vehicle-mounted device communication controller according to claim 7, wherein after the responding portable unit receives a challenge signal (Ca) and the controller receives a challenge response signal to the challenge signal from the responding portable unit, a communication between the controller and the responding portable unit is established.

* * * * *